UNITED STATES PATENT OFFICE.

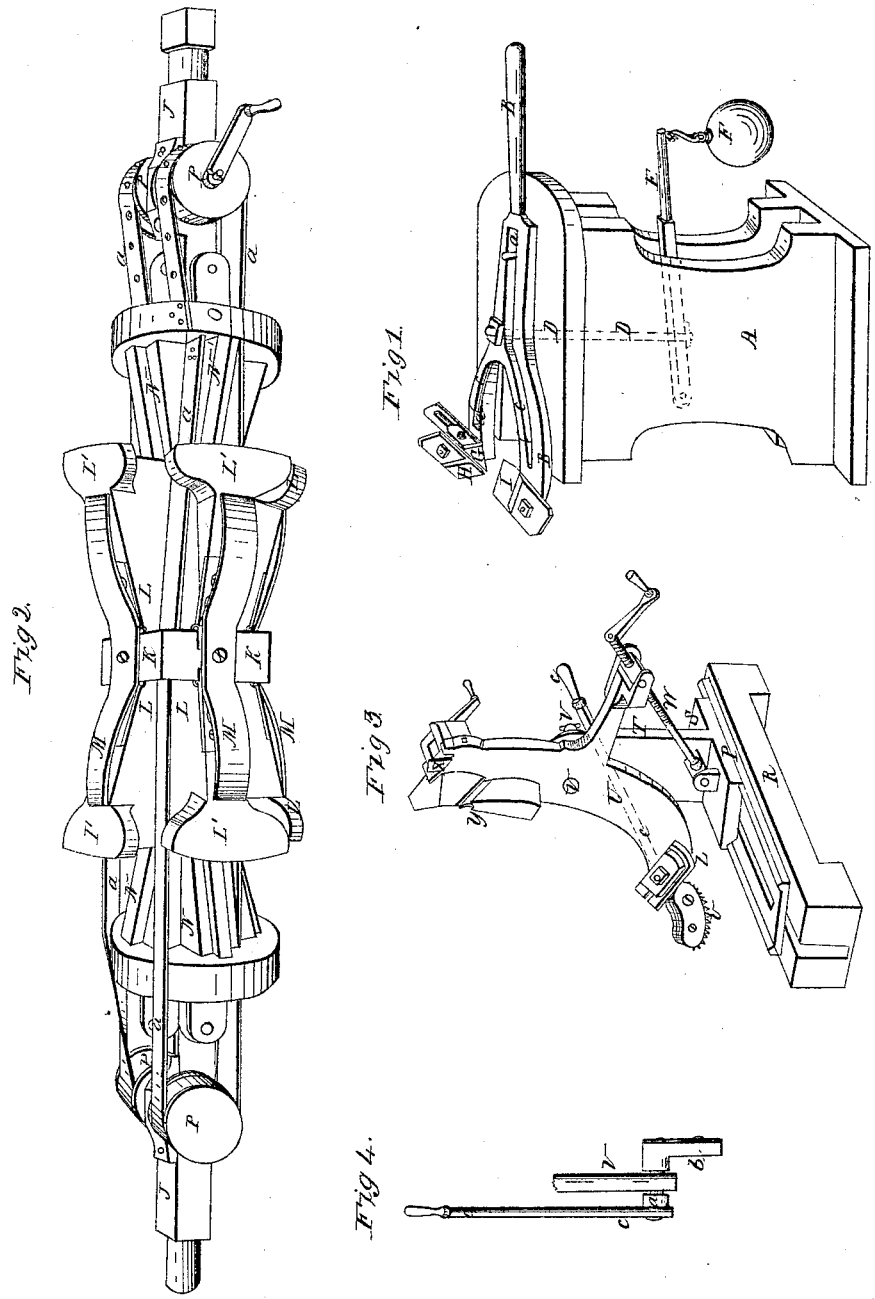

WM. G. BURR, OF MOUNT PLEASANT, NEW YORK.

TOOL OR INSTRUMENT TO BE USED IN THE MANUFACTURING OF BARRELS, KEGS, AND OTHER KINDS OF COOPER'S WARE.

Specification of Letters Patent No. 1,368, dated October 12, 1839.

*To all whom it may concern:*

Be it known that I, WILLIAM G. BURR, of Mount Pleasant, in the county of Westchester and State of New York, have invented certain new and Improved Instruments or Tools to be Used in the Manufacturing of Barrels, Kegs, and other Kinds of Coopers' Work; and I do hereby declare that the following is a full and exact description thereof.

The instruments, or tools, invented by me for facilitating the manufacturing of barrels, and other coopers' work, consist, principally, of three distinct implements, one of which comprises a rest, and the cutting tools sustained thereon, for the purpose of turning the heads, and chamfering them so as to prepare them to enter the groove prepared for their reception by the croze. The second instrument consists of a shaft, or mandrel, with its appendages, so constructed that by means of levers, or arms, regulated by sliding wedges forced forward by appropriate machinery, the barrels are held upon the shaft, or mandrel, properly centered, so that when the shaft, or mandrel, is placed in a lathe, the outside of the vessel may be turned, the chime formed, and the beveling, howeling, and crozing be effected. The third instrument consists of a series of tools placed upon a suitable rest, or stand, for the purpose of turning the ends of the vessel when centered and fixed in the lathe, and to prepare it in all respects for the reception of the heads.

The apparatus which I shall first describe, consists of the rest and cutters for turning and chamfering the edges of the heads. The head, after being doweled together, is placed against a face chuck in a lathe, and is held against it by means of a front center, upon which there is a flat, or somewhat concave revolving plate, by which the head can be secured in place during the operation of turning. This kind of face chuck is well known to machinists, and does not, therefore, require any particular description. When the head has been so fixed, and is ready for turning, the rest and cutters, represented in Figure 1, of the accompanying drawings, are to be brought into operation.

A, A, is the body of the rest which is to be sustained upon the bed of the lathe, or upon a suitable post, or standard, in front of it. Upon the upper side of this rest, which is made flat, is situated the forked lever B, B, and to this are attached the cutters by which the head is to be turned.

C, C, is a forked holdfast by means of which the forked lever is held down upon the rest. A bolt, represented by the dotted lines D, D, passes through the holdfast C, and through a corresponding hole in the top of the rest, and has its lower end attached to a lever E; a weight F, sufficiently heavy to hold the forked lever down, and to allow it to slide between the holdfast and the top of the rest, is hung upon this lever. On the upper side of the forked lever B, there are three mortises, or slots, *a, a, a,* which receive three pins, or knobs, projecting down from the holdfast into them; there is also a slot, or mortise, through the forked lever for the bolt D, to pass through; these several slots, or mortises, allow the forked levers to slide back and forth upon the rest, while it may also be turned around on the bolt D, so as to move it in any required direction.

G, H, I, are three cutters affixed by screws, or otherwise, upon the ends of the forked lever. The cutter G, is in the form of a screever, or parting tool, which serves to cut the barrel head to the required diameter, leaving it perfectly round. The cutter H, upon the same fork, serves to make the chamfer, or bevel, on the upper side, or face, of the head. On the other fork of the lever is the cutter I, which is used to cut the chamfer on the inside of the head.

Fig. 2 is the shaft, or mandrel, with its appendages, for centering and holding the barrel, or other vessel, so that it may be placed in a lathe to be turned on its outside, have its chime properly formed, and the beveling, howeling, and crozing completed.

J, J, is the shaft or mandrel which should be made square, although this is not absolutely necessary. On the middle of this shaft is affixed a block K, K, to which are hinged eight or more jointed arms L, L, the heads of which L′, L′, are to be forced against the inside of the barrel, for the purpose of centering it, and holding it to be turned; these arms are kept in place by means of the springs M, M. To force out the arms, there are two sets of wedges, which are to be drawn or forced in under them. These wedges are marked N, N, and they are attached at their heads, by means of pins, or notches to the sliding collars O, O, four being attached to each collar. A shaft near each end of this instrument, crosses, and runs in suitable bearings on the main shaft J, J, and carries pulleys P, P, P', P', around which pulleys pass the bands Q, Q', for the purpose of forcing the wedges under the arms L, L. These bands should be formed of gearing chains, as they are to be received on to pins, or teeth, on one of the pairs of pulleys (or the wedges may be moved by levers or screws). Supposing the instrument to be in the position shown in the drawing, and the bands Q, Q', to be attached to the upper side of the collar O', or of its set of wedges, and to the under side of the collar O, or its set of wedges, it will be seen that both sets of wedges will be simultaneously forced under the respective arms L, L, or withdrawn therefrom, according to the direction given to the pulleys P', in turning them.

When a barrel has been set up, and the staves confined by truss hoops, the above described apparatus is to be passed into it, so as that the movable arms shall occupy its middle portion, when by turning the pulleys P', P', in the proper direction, the ends L', L', of the jointed arms will be made to bear against the staves, and the shaft J, J, will stand in the axes of the barrel. A ratchet wheel and pawl or other device, may be used to prevent the slipping of the wedges; when the wedges are forced forward by screws 2, this will not be necessary.

Fig. 3 represents the instrument for turning and beveling the ends of the barrel, and for howeling and crozing it after it has been fixed in a lathe upon the shaft, or mandrel, Fig. 2.

R, is a part of the lathe bench, or of a suitable fixture to serve as a basis to the apparatus.

S, is a sliding head, which may be held steadily upon the base R, in any required position, in the ordinary mode; upon the vertical standard T, constituting a part of this head, or rest, the curved cutter bearer U, is sustained, and turns on a stout center bolt at V. The cutter bearer is governed by means of a screw and winch W, attached to the head in a manner rendered perfectly plain by the drawing, so that by means of this screw, and the sliding of the head upon its base, either of the cutters may be brought into action at pleasure.

X, is a chisel, or cutter, for cutting, or turning off, and truing the ends of the staves.

Y, is a beveling cutter for giving the bevel to the chime.

Z, is the howeling cutter, which stands at right angles, or nearly so, with the face of the cutter bearer U. These several cutters are to be fixed and adjusted by means of screws, or wedges. The crozing tool $b$, which is furnished with cutting teeth, resembling saw teeth, on its lower edge, is governed by the lever $c$, by the raising of which this tool is brought down upon the staves, the crozing tool being placed upon a shaft $d$, that passes through the lower end of the cutter bearer; as shown more distinctly in Fig. 4, which represents the back edge of said cutter bearer, with the lever $c$, and the croze $b$.

The turning or smoothing the outside of the cask as it revolves in the lathe I effect by means of a common jack plane, which I hold against it, with its lower end resting against a suitable bench, or support, as it is moved along the barrel.

Having thus, fully described the instruments or tools used by me in the manufacturing of barrels and other vessels of coopers' ware, what I claim therein as constituting my invention, and desire to secure by Letters Patent, is:

1. The manner of constructing the instrument for turning and chamfering the heads of such vessels, said instruments consisting of the forked lever, carrying the three cutters, and being held down upon the rest by a holdfast and weighted lever, formed and operating substantially in the manner set forth.

2. I claim the apparatus for centering and holding such vessels while being turned, said apparatus consisting of a mandrel, with jointed arms, operated upon by sliding wedges, which are forced forward and retracted by means of a band and pulleys, or by means of screws, or other known mechanical devices producing a like effect, the whole being combined, and operating, as set forth.

3. I claim the within described instrument for turning or truing, the ends of the staves, and for performing the operations of beveling, howeling, and crozing the barrel, or other vessel; the respective cutters for that purpose being attached to a cutter bearer in the manner set forth, and said cutter bearer being governed by means of a screw, operating in the manner of that shown at W, in the accompanying drawing, and the whole being formed substantially in the manner herein described.

WM. G. BURR.

Witnesses:
ABRAHAM MILLER,
ABNER F. JOY, Jr.